Dec. 10, 1957       S. B. HEATH ET AL       2,816,081
PREPARATION OF METAL PHOSPHATE CATALYST
Filed March 27, 1953
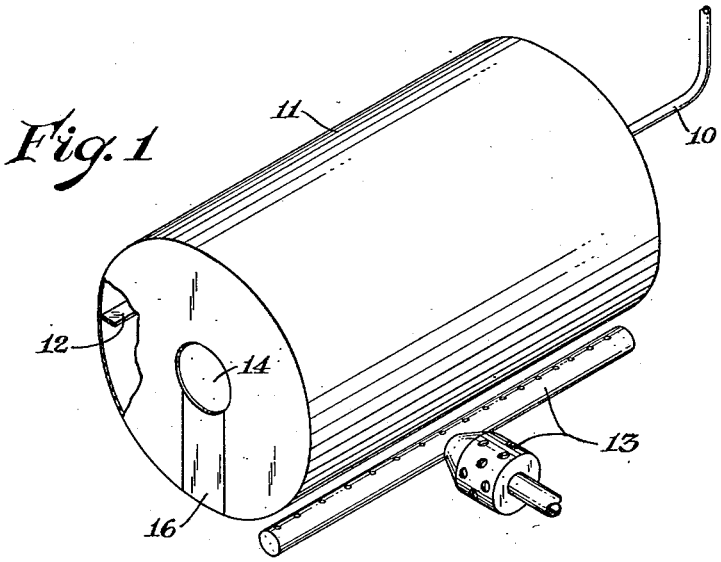
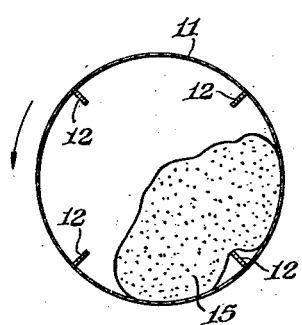
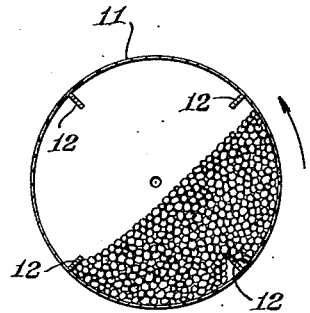
INVENTORS.
Sheldon B. Heath
John W. Corey
Herbert E. Chinworth
BY *Griswold & Burdick*
ATTORNEYS United States Patent Office 2,816,081
Patented Dec. 10, 1957

2,816,081

PREPARATION OF METAL PHOSPHATE CATALYST

Sheldon B. Heath, Midland, John W. Corey, Sanford, and Herbert E. Chinworth, Midland, Mich., assignors to The Dow Chemical Company, Midland, Mich., a corporation of Delaware Application March 27, 1953, Serial No. 345,108

4 Claims. (Cl. 252—437)

This invention concerns an improved method of making calcium nickel phosphate catalysts which are effective in the dehydrogenation of olefins, having from 4 to 6 carbon atoms, in a carbon chain of the molecule, to form corresponding diolefins. It concerns especially an improved method of drying an aqueous slurry of such a catalyst, whereby a dry catalyst material having, in powdered form, a bulk density of from 0.45 to 0.8 gram per cubic centimeter may readily be obtained.

Calcium nickel phosphate catalysts of the type with which this invention is concerned are described in U. S. Patents Nos. 2,456,367 and 2,456,368, in which a batch method of making the catalysts is also described. A process of dehydrogenating olefins, having from 4 to 6 carbon atoms in a carbon chain of the molecule, using these catalysts has been described in the above-identified patents and also in U. S. Patents Nos. 2,442,319 and 2,442,320. In the process described in these patents, a solution of calcium and nickel salts (containing from 7.5 to 9.2 and preferably from 8.2 to 9.0 atoms of calcium per atom of nickel) is added to a solution of a soluble phosphate while maintaining the resultant mixture in a neutral or preferably alkaline condition, whereby a precipitate of a substantially insoluble calcium nickel phosphate is obtained. The precipitate is separated from the liquor, washed with water to remove readily soluble compounds and dried. The dried product is described as a hard yellow gel, which may be reduced in size to small granules and used as a catalyst. Preferably, the gel is pulverized, treated with a suitable lubricant and pressed into pills, tablets or pellets of suitable size and shape. In U. S. Patents Nos. 2,442,320 and 2,456,368 is described an improved catalyst made by adding a minor amount of chromium oxide to the precipitated calcium nickel phosphate, preferably after pulverizing the dry gel and prior to pressing into pellets.

In U. S. Patent No. 2,542,813 is described an improved method of precipitation of the calcium nickel phosphate which involves the continuous admixture of separate streams of an alkali, preferably ammonia, and of an aqueous solution of calcium and nickel salts in the proper relative proportions, one of which streams contains a dissolved orthophosphate, so that the resultant mixture is maintained at pH values between 7.7 and 8.3 and contains within the reaction zone at least a portion of the calcium nickel phosphate which is formed and precipitated. By this method there is obtained a precipitate that settles quickly out of the aqueous liquor to form a lower layer which contains 5 or more percent by weight of the phosphate and which may readily be filtered to produce a filter cake which contains 20 or more percent by weight of the phosphate. The filter cake may be dried, pulverized and pressed, with or without the addition of chromium oxide, to pellets of desired size and shape.

As described in the patents just mentioned, the calcium nickel phosphate material is effective in catalyzing the dehydrogenation of olefins having 4 to 6 carbon atoms in a carbon chain of the molecule to form the corresponding diolefins. In such process, the granular catalyst is usually charged to the reaction chamber and the lubricant, if any, in the catalyst is removed by passing air, steam, a mixture of air and steam, or an inert gas over the catalyst at a temperature of 450° to 750° C. Thereafter, a mixture of steam and the olefin reactant, e. g. a n-butylene, is passed through the catalyst bed at a reaction temperature between 500° and 750° C., preferably between 550° and 700° C., whereby a portion of the olefin, e. g. a n-butylene, is dehydrogenated to the corresponding diolefin, e. g. 1,3-butadiene.

The activity of such catalyst in the olefin dehydrogenation reaction is characterized by the proportion of olefin chemically converted into diolefin and other products during passage through the reaction zone. The efficiency, or selectivity, of the catalyst is measured by the amount of the desired diolefin which is formed from the olefin which has been consumed.

During use of calcium nickel phosphate catalysts for the dehydrogenation of olefins to make diolefins, it has been observed that the activity and selectivity of such a catalyst often vary with change in the bulk density of the catalyst, especially when the catalyst comprises chromium oxide. The catalysts are usually employed in the form of coarse granules or pressed tablets or pellets, and the term "bulk density," used herein relative to such granules, tablets, or pellets, refers to the weight per unit total volume of a settled quantity of such pieces with the voids in and between such pieces being filled with air and occupying a part of the total volume. Different batches of a given catalyst may vary in bulk density due to changes in the procedure for making, drying or pressing the catalyst as pellets. It has been determined that the best of such catalysts in the form of uniform pellets, have a bulk density of from about 0.95 to about 1.1 grams per cubic centimeter. Catalysts which are more dense than just stated tend to be less active than those having a density within the stated range. Catalysts having a bulk density below the stated range are usually more active, but also have a lower selectivity than those catalysts having a density within the stated range, i. e. the less dense catalysts tend to convert a larger proportion of olefin, but tend to form from such converted olefin a smaller proportion of the desired diolefin and a larger proportion of undesirable by-products.

Moreover, it has now been observed that the properties of the catalyst pellets which have a bulk density of from 0.95 to 1.1 grams per cubic centimeter are dependent upon the bulk density of the powdered material from which the pellet or tablet was pressed. The term "buk density" of powdered material herein refers to the weight per unit total volume of a quantity of loose, non-compacted powder, with the voids in and between the powder particles being filled with air and occupying a part of the total volume.

It has been determined that a calcium nickel phosphate material, made as described in the aforementioned patents, in the form of a dry powder, e. g. of a fineness to pass through a 12-mesh screen, and having a bulk density of from about 0.45 to about 0.8, preferably from 0.5 to 0.7 gram per cubic centimeter, is capable of being pressed in a single pressing operation into strong pellets, having a bulk density of 0.95 to 1.1 grams per cubic centimeter, and having a desirable catalytic activity and selectivity. When the bulk density of the dry, ground catalyst material is appreciably greater than about 0.7 gram per cubic centimeter, the pressed tablets tend to be too dense, less active catalytically, and mechanically too weak and friable for satisfactory service. When the bulk density of the dry, ground catalyst material is appreciably less than about 0.5 gram per cubic centimeter, the density of the pressed tablets tends to be too low although the mechanical crushing strength may be excellent. The density of the pressed tablet may be increased by grinding and repressing the material, repeatedly if necessary, but the catalyst so made, even if the density of the tablets is in the desired range, tends to be overly active and often catalyzes the formation of excessive proportions of undesired by-products.

The general objective of this invention is to provide an improved calcium nickel phosphate catalyst which is effective in the dehydrogenation of olefins, having from 4 to 6 carbon atoms in a carbon chain of the molecule, to form corresponding diolefins.

A particular objective is to provide an improved method of making a dry calcium nickel phosphate material that is capable of being pressed in a single pressing operation into pellets which are catalytically effective and which have a bulk density of 0.95 to 1.1 grams per cubic centimeter.

A more particular objective is to provide such an improved method whereby there is obtained a dry calcium nickel phosphate material which, in powdered form, has a bulk density of from about 0.45 to about 0.8 gram per cubic centimeter.

Other objects will be apparent from the following description of the invention.

It has been found that the objectives of this invention are attained by an improved method, hereinafter described in detail, of drying an aqueous slurry of precipitated calcium nickel phosphate. According to the invention, an aqueous slurry of precipitated calcium nickel phosphate, such as is prepared according to the processes described in the aforementioned patents, is heated to vaporize water therefrom, and, during such heating, is subjected to mechanical working, whereby there is obtained a dry material which, after grinding, has a bulk density of from about 0.45 to about 0.8 gram per cubic centimeter. The resulting dried catalyst is capable of being pressed in a single pressing operation into pellets having a bulk density of 0.95 to 1.1 grams per cubic centimeter and having desirable mechanical and catalytic properties.

The accompanying drawing, hereinafter described in detail, shows an apparatus suitable for use in practice of the invention, but the operations of this invention can be carried out with other apparatus and the invention is not limited to any particular form or type of apparatus.

Figure 1 of the drawing is a conventionalized sketch of a rotary drier, partly cut away.

Figure 2 is a sketch of a transverse section of the rotary drier and its contents at one stage in the drying process.

Figure 3 is a sketch of a transverse section of the rotary drier and its contents at a later stage in the drying process.

The benefits of the improved method are due, at least in part, to the compression or compaction of the gel structure of the wet precipitate during the drying process. This compaction is most advantageously performed by mechanical working of the wet mass and, apparently, affects the properties of the catalyst independently of the compression of the dry gel.

When an aqueous slurry of the calcium nickel phosphate precipitate is dried in conventional manner, e. g. on trays in a heated oven, and the dry gel is ground, the bulk density of the ground dry gel is usually from about 0.25 to about 0.35 gram per cubic centimeter. Such material, pressed directly in a single pressing operation in a conventional tableting machine, forms pellets having a bulk density of about 0.4 to about 0.6 gram per cubic centimeter, which density is undesirably low. When such low-density tablets are ground and re-tableted, the density is increased and the catalytic effectivity is improved, but not to the degree attained by the improved method of this invention.

In the improved method of this invention, the wet gel is subjected to a mechanical working during the drying process. This working must be performed during that portion of the drying process when the wet mass has the characteristic of a coherent batter to a soft, plastic dough, and must be accompanied by evaporation of water from the mass.

The mechanical working of the wet plastic mass may be obtained by kneading, rolling, tumbling, mulling, squeezing or similar actions which have the effect of compressing portions of the mass of material, pulling portions away from the bulk, blending separated portions back together, folding a portion over the remainder, and which have the overall effect of supplying an internal rubbing movement and compaction to the wet mass.

The wet mass has the proper working consistency when the water content is from about 40 to 75 percent by weight. Mixtures having more than this proportion of water are too fluid to be compacted satisfactorily by mechanical working. Mixtures having less than this proportion of water are too stiff and rigid to permit an adequate amount of internal movement.

It is preferable to operate in such a way that the drying and densification of the calcium nickel phosphate material slurry takes place in several stages.

In the first stage, such a slurry, which usually contains up to 20 percent by weight of solid material, is heated at a temperature, usually up to about 100° C., at which water evaporates from the mass until the composition contains, by weight, about 30 to 40 percent solids and 60 to 70 percent water. The composition then has a dough-like consistency and can be kneaded, etc. We subject the mass at such a double-like second stage to mechanical working while continuing the heating and vaporizing of water. The evaporation of water from the mass is necessary at this stage in order to shrink the highly swollen gel mass, but tends also to harden the mass and deter its densification. It is desirable to add water, or preferably additional amounts of the catalyst slurry, to the dough mass at this second stage in order to maintain the water content of the dough between about 60 and about 70 weight percent, and to continue to work the mass mechanically while adding water thereto and evaporating water therefrom until a test portion, removed from the wet mass, dried and ground, has a bulk density of from 0.4 to 0.6 gram per cubic centimeter.

In the third stage of the preferred method, the feeding of additional water is discontinued, and the heating to evaporate water and mechanical working are continued until a test portion, removed from the mass, dried and ground, has a bulk density of from 0.5 to 0.7 gram per cubic centimeter.

In the final stage, the drying is completed in any desired manner, e. g. by heating the catalyst at atmospheric or sub-atmospheric pressure and with or without agitation of the catalyst mass.

The invention may be practiced in any apparatus capable of providing the necessary drying and mechanical working conditions. The mechanical working of the wet mass may be provided by moving blades, arms, lifters and the like and heat may be supplied by heated fluids or otherwise to external or internal heat transfer surfaces. Dough mixers, such as are commonly used by the bread and rubber industries, may be employed. A particularly satisfactory, economical and effective drier for the purposes of this invention is a rotary drier such as is shown diagrammatically in Figure 1 of the drawing.

In carrying out the steps of the improved method of this invention in a rotary drier as shown in Figure 1 of the drawing, a suitable aqueous slurry of calcium nickel phosphate is charged, from a source of supply not shown, via pipeline 10 to the drum 11, here shown as cylindrical, mounted to turn on its longitudinal axis and driven by usual means not shown. The inside wall of the drum 11 is provided with suitable lifting bars, a part of one of such bars being shown at 12 through a cut-away section of the end wall of the drum. Suitable means for heating the drum are portrayed by the gas burner 13.

The drum is rotated about its longitudinal axis and heat is supplied to cause evaporation of water from the slurry charge. Steam so formed escapes through openings, one of which is shown at 14, centrally located in the end walls of the drum.

In the first stages of such drying, the slurry charge in the drum is fluid and the action of the rotating drum and the lifting bars is merely contributory to the agitation of the liquid slurry. However, when the water content of the mass is reduced to about 75 percent by weight, the mass changes from a fluid liquid to a coherent pasty batter and, on continued removal of water, to a soft plastic dough. The wet mass in the rotary drier then assumes a form, suggested by 15 in the cross sectional sketch in Figure 2, which resembles a sausage roll or dough loaf. On further drying, the dough mass breaks up into chunks. The turning action of the drier drum and the lifting action of the lifting bars supply a mechanical working, blending, kneading, rubbing, rolling and tumbling action to the wet mass.

Because the continued evaporation of water from the dough mass usually results in hardening of the mass before an adequate amount of mechanical working has been obtained, it is preferable to charge additional portions of aqueous slurry to the drier after the previous charge or charges have been converted to the desired dough stage. This practice has the multiple advantage of maintaining the water content of the dough mass in the range of 60 to 75 percent by weight at which the wet mass has the proper consistency to permit easy mechanical working, of prolonging the time of working at such consistency, and also of adding to and increasing the weight of the mass in the drier, which increased weight makes the rolling and kneading action more effectual in densifying the gel and increases the productive capacity of the drier.

The supplemental charging of slurry may be continuous, or may be intermittent. It is preferable, for convenience, to charge the slurry in several increments, each charge being of such size as to fill the drier to its operating capacity, and to heat and work the charge after each addition to drive off water until the mass reaches the soft dough stage before adding the next incremental charge of slurry. At least three, and usually not more than seven, such incremental charges are preferred.

The soft dough mass is worked, preferably with additional charges of slurry as described, until a sample, taken from the dough mass, dried and ground, has a bulk density of from 0.4 to 0.6 gram per cubic centimeter. Thereafter, drying is continued without further additions of slurry. As the moisture content of the dough is reduced below about 60 percent by weight, the dough becomes somewhat less cohesive and begins to break apart into an increasing number of smaller and smaller chunks. These chunks themselves break down, and, due to the tumbling, rolling action in the rotary drier, are shaped into rounded lumps or balls, such as are suggested by the sketch of Figure 3. When the moisture content of the balls is reduced to about 30 to 35 percent by weight, the balls are usually from about ½ inch to 1½ inches in diameter, and the bulk density of a sample portion, dried and ground, is usually about 0.5 to 0.7 gram per cubic centimeter. Further tumbling in the rotary drier has no appreciable effect on the density of the material. Final drying of the catalyst material may be performed in the rotary drier, or otherwise, such as on trays in a conventional heated oven.

The dried material may be removed from the rotary drier through a suitable opening such as that formed in the end wall by removal of the removable plate 16.

The invention will now be illustrated by reference to an example, which should not be construed as limiting the invention. In the example parts and percentages are by weight unless otherwise indicated.

A calcium nickel phosphate material was prepared by the method described in U. S. Patent No. 2,542,813 and the settled precipitate was collected on a filter, washed with water and freed of excess liquor. A sample of this filter cake, referred to as Sample A, will be more particularly described hereinafter.

About 11,400 pounds of such washed filter cake, containing about 2,000 pounds of solid material or about 17.5 percent of the filter cake, was dried in a rotary drier similar to that described hereinbefore and portrayed in the drawing. The filter cake was converted into a pumpable slurry by agitation, and the slurry was pumped into the rotating drier in a total of five separate portions, the portions being, respectively, approximately 36%, 27%, 18%, 10% and 9% of the total amount of slurry charged. Heat was supplied continuously and water was evaporated from the mass. After each charge, the mass was dried until a dough roll formed in the drier before the subsequent increment of slurry was charged. Following the last addition of slurry, the mass was allowed to dry until the soft dough was just beginning to break up into chunks. At this time, a sample of the dough was removed. This sample, referred to as Sample B, will hereinafter be more particularly described.

As the heating, drying and rolling was continued, the dough broke into chunks, the chunks broke into smaller lumps, and the lumps were rolled into rounded balls.

When the balls were about ½ to 1½ inches in diameter, dust began to form in the drier and the drier was stopped. A sample of this product was taken as Sample C.

Samples A, B and C were each weighed and then dried on trays in a heated oven. From the loss in weight during drying, the moisture content of the samples, when taken, was found to be approximately as follows:

| Sample | Approximate Water Content, percent |
| --- | --- |
| A | 82.5 |
| B | 55 |
| C | 35 |

The dried Samples A, B and C were each ground to a fineness to pass through a 12-mesh screen sieve. The powder so formed comprised particles varying in size largely from 20 to 80 mesh, the average being about 30 to 50 mesh size. A portion of each of the dry, powdered Samples A, B and C were mixed with 2 percent of a finely divided chromium sesquioxide; the materials so made are herein identified as Samples A—Cr, B—Cr and C—Cr to indicate the presence of chromium sesquioxide and the corresponding relationship to Samples A, B and C, respectively.

The bulk densities of these powdered materials was determined in a standard Scott volumeter commonly used in the paint industry for determination of the bulk density of solid pigments. In this test, the powdered material was allowed to fall by gravity through a distance of about nine inches over a series of four cascading baffles and was collected without tamping or other compacting in a 1-inch cubical metal box which was filled to overflowing and the excess carefully struck off level with the top. The net weight of powder so collected was determined and the bulk density computed as grams per cubic centimeter. The bulk densities of the dry powdered samples of this example are shown in Table I.

The dry, ground powders were then separately mixed with 2 percent lubricating graphite and pressed into 3/16-inch diameter by 3/16-inch long cylindrical pellets in a F. J. Stokes Machine Company, Model BB-2 Rotary Tablet Machine. Each such powder was made into pellets having a bulk density of from 0.95 to 1.05 grams per cubic centimeter. When the pellets first formed had a bulk density of less than 0.95 gram per cubic centimeter, they were reground and repelletized, repeatedly if necessary, until the bulk density of the batch of pellets was within the above-stated range. In the Table I is indicated the number of pelletizing operations which were necessary for each of the samples in order to produce pellets having a bulk density in the specified range. In the table, "BD" signifies bulk density in grams per cubic centimeter.

Table I

| Sample | BD of Powder | Number of Pelletizings Required to BD 0.95–1.05 |
|---|---|---|
| A | 0.232 | 2 |
| A—Cr | 0.268 | 4 |
| B | 0.535 | 1 |
| B—Cr | 0.547 | 1 |
| C | 0.672 | 1 |
| C—Cr | 0.652 | 1 |

From these data, it can be seen that the calcium nickel phosphate material dried in accordance with the improved method of this invention has, as a dry ground powder, a bulk density between 0.5 and 0.7 gram per cubic centimeter and is capable of being pressed in a single pressing operation to pellets having the desired bulk density of between 0.95 and 1.05 grams per cubic centimeter. In contrast, the same starting material, dried on trays, has a bulk density considerably below 0.5 gram per cubic centimeter and requires two or more pressing operations to produce pellets having the desired density.

A quantity of product in the form of balls having a size from ½-inch to about 1½ inches diameter and similar to Sample C described above was dried completely in the rotary drier. The dried product was ground to a powder and the bulk density measured as hereinbefore described. The bulk density of this product, dried entirely in the rotary drier, was the same as that of the same ½ to 1½-inch diameter balls taken from the rotary drier at about 35 percent residual moisture and dried in heated trays. This test demonstrates that the densification due to mechanical working of the wet mass during drying was complete by the time that the moisture content had been reduced to about 35 percent and the material had been shaped into rounded balls; i. e. continued drying in the rotary drier was not detrimental, but did not result in further densification.

In order to show the effect of the procedure used in drying the calcium nickel phosphate material on the effectivity of the product in catalyzing the thermal dehydrogenation of n-butylenes to 1,3-butadiene, the pelletized Samples A—Cr, B—Cr and C—Cr, hereinbefore described, were tested as follows. A bed of the pelletized catalyst was conditioned by passing, through the bed, a mixture of steam and air at a temperature of about 650° C. to remove the graphite lubricant from the pellets. Thereafter, the bed was flushed free of air with steam, after which a vapor mixture of one part by volume of 2-butylene having a purity of about 99 percent and approximately 20 parts of steam was passed through the bed at a temperature of approximately 575° C. for 28 minutes, during which time about 0.94 gram molecular weight of butylene was fed to the bed. Vapors flowing from the bed were passed successively through a water-cooled condenser and a trap cooled with ice to remove most of the water vapor, then through a bed of solid calcium chloride and finally through a trap cooled with solid carbon dioxide where hydrocarbons having three or more carbon atoms in the molecule were condensed and collected. The hydrocarbon condensate was weighed and analyzed for butadiene. The volume of the gases remaining uncondensed was measured.

It may be mentioned that the volume of uncondensed gaseous products varies inversely, and the amount of hydrocarbon condensate varies directly, with the selectivity of the catalyst in causing the dehydrogenation reaction to form butadiene, rather than side reactions such as cracking and carbonization of the hydrocarbons; in other words, a catalyst of high selectivity causes the formation of a smaller volume of uncondensed gas and a larger amount of hydrocarbon condensate than is obtained under similar conditions from a catalyst of low selectivity. The butadiene-forming activity of the catalyst is measured by the amount of butadiene produced related to the amount of butylene fed to the catalyst bed, while the selectivity of the catalyst is measured by the amount of butadiene produced related to the amount of butylene which is consumed during passage over the catalyst bed. The amount of butadiene produced was estimated from the amount of the hydrocarbon condensate and the proportion of butadiene contained therein. Since the hydrocarbon condensate contains a small proportion of other hydrocarbons, such as $C_3$ hydrocarbons, e. g., propylene, in addition to unreacted butylene, the estimation of the amount of butadiene and calculations based thereon are only approximations, but are sufficiently accurate for comparison of the effectiveness of different catalysts for the production of butadiene under similar conditions of reaction.

After feeding the vapor mixture of steam and butylene to the catalyst for the 28-minute period, the flow of butylene was interrupted and the flow of steam alone was continued through the catalyst bed for two minutes. Air was then admixed with the constant flow of steam and the mixture was passed into the catalyst bed at a rate corresponding to 800 liters of air (expressed as at a temperature of 0° C. and at 760 mm. pressure) per liter of the catalyst bed per hour. The steam and air mixture was passed through the catalyst bed at a temperature of approximately 575° C. for a period of 28 minutes for purpose of oxidizing and removing carbonaceous deposits from the bed. Air was then flushed from the bed by passing steam alone into the bed for two minutes. This constitutes a one-hour cycle of operations, i. e., passing a mixture of steam and butylene through the catalyst bed for 28 minutes, flushing the bed with steam for two minutes, passing the steam and air mixture through the bed for 28 minutes, and again flushing the bed with steam for two minutes. In this experiment the above described cycle of operations was repeated five times, constituting the first part of the test.

Following the fifth and last cycle of the first part of the test, the temperature in the reaction zone was raised to approximately 650° C. and another series of five cycles of operation was carried out at that temperature, constituting the second part of the test.

In Table II are shown the results of these tests. In the table, the data and results of the 5 cycles are averaged for each part of the test and for each of the catalysts. The volume of uncondensed gas is expressed as liters under standard conditions of temperature and pressure, i. e. at 0° C. and 760 mm. pressure. The estimated selectivity is the estimated yield of 1,3-butadiene based on the amount of butylene consumed.

Table II

| Test | Sample | Uncondensed Gas, Liters | 1,3-Butadiene in Condensate | | Estimated Selectivity, Percent |
|---|---|---|---|---|---|
| | | | Mole percent | Mole | |
| Part 1, Cycles 1–5 575° C. | A—Cr | 8.1 | 25.6 | .230 | 84 |
| | B—Cr | 6.0 | 19.4 | .177 | 86.5 |
| | C—Cr | 5.5 | 18.7 | .172 | 89.5 |
| Part 2, Cycles 6–10 650° C. | A—Cr | 18.6 | 49.7 | .411 | 78 |
| | B—Cr | 13.7 | 41.7 | .363 | 84 |
| | C—Cr | 11.3 | 38.9 | .350 | 89.5 |

From these data, it can be seen that the catalysts (Samples B—Cr and especially C—Cr) prepared from the calcium nickel phosphate material which had been dried with mechanical working and densification by the improved method of this invention have somewhat less total activity, but considerably more selectivity, in the dehydrogenation of butylene to 1,3-butadiene than does the catalyst (Sample A—Cr) prepared from material which had been dried in a conventional manner, i. e. on trays.

We claim:

1. In a method for making a calcium nickel phosphate catalyst wherein a calcium nickel phosphate material is precipitated from a non-acidic aqueous medium and wherein the precipitate is collected and washed with water and the wet calcium nickel phosphate is dried, the improvement in the drying operation which comprises the steps of (1) forming a wet calcium nickel phosphate mass containing from 60 to 70 percent by weight of water by heating an aqueous calcium nickel phosphate slurry which initially contains a greater proportion of water to vaporize water therefrom; (2) mechanically working the wet mass while continuing the heating and vaporizing of water and maintaining the water content of the mass between 60 and 70 percent by weight until the calcium nickel phosphate ingredient, in dry powdered form, has a bulk density in the range from 0.4 to 0.6 gram per cubic centimeter; (3) continuing the heating of the wet mass to vaporize water therefrom and continuing the mechanical working of the wet mass until the water content thereof is less than 40 percent by weight and the calcium nickel phosphate ingredient, in dry powdered form, has a bulk density in the range from 0.5 to 0.7 gram per cubic centimeter; and (4) continuing the heating of the wet mass until the calcium nickel phosphate is substantially dry.

2. The improvement according to claim 1 comprising the further steps of grinding and screening the dry calcium nickel phosphate to a powder having a fineness of from 12 to 80 mesh screen size, and pressing the powder in a single pressing operation into pellets having a bulk density of from 0.95 to 1.1 grams per cubic centimeter.

3. In a method for making a calcium nickel phosphate catalyst wherein a calcium nickel phosphate material is precipitated from a non-acidic aqueous medium and wherein the precipitate is collected and washed with water and the wet calcium nickel phosphate is dried, the improvement in the drying operation which comprises the steps of (1) forming a wet calcium nickel phosphate mass containing from 60 to 70 percent by weight of water by heating an aqueous calcium nickel phosphate slurry which initially contains a greater proportion of water to vaporize water therefrom; (2) feeding water to the mass to maintain from 60 to 70 percent by weight of water in the wet mass, and mechanically working the wet mass while continuing the heating and vaporizing of water until the calcium nickel phosphate ingredient of the mass, in dry powdered form, has a bulk density in the range from 0.4 to 0.6 gram per cubic centimeter; (2) continuing the heating of the wet mass to vaporize water therefrom and continuing the mechanical working of the wet mass until the water content thereof is less than 40 percent by weight and the calcium nickel phosphate ingredient, in dry powdered form, has a bulk density in the range from 0.5 to 0.7 gram per cubic centimeter; and (4) continuing the heating of the wet mass until the calcium nickel phosphate is substantially dry.

4. The improvement according to claim 3 wherein the water fed to the wet calcium nickel phosphate mass in step (2) is in the form of a slurry in water of freshly precipitated calcium nickel phosphate, which slurry contains at least 75 percent by weight of water.

References Cited in the file of this patent

UNITED STATES PATENTS

| | | |
|---|---|---|
| 2,297,300 | Hardesty et al. | Sept. 29, 1942 |
| 2,335,374 | Woodward | Nov. 30, 1943 |
| 2,438,450 | Nelson | Mar. 23, 1948 |
| 2,456,367 | Britton et al. | Dec. 14, 1948 |
| 2,542,813 | Heath | Feb. 20, 1951 |